Figure 1:
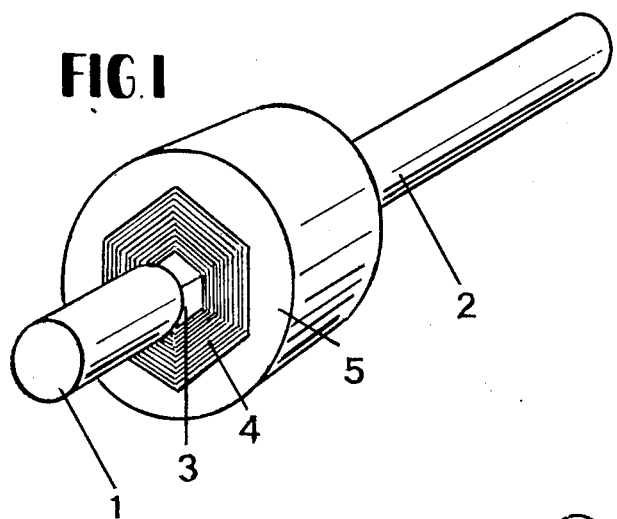

United States Patent [19]

Lundgren

[11] 4,012,923
[45] Mar. 22, 1977

[54] VIBRATION DAMPING COUPLING
[75] Inventor: Bengt Lundgren, Ulricehamn, Sweden
[73] Assignee: SKF Nova A.B., Goteborg, Sweden
[22] Filed: Nov. 6, 1975
[21] Appl. No.: 629,300
[52] U.S. Cl. .......................... 64/11 R; 64/27 NM
[51] Int. Cl. ............................................ F16d 3/17
[58] Field of Search ............... 64/11 R, 27 NM, 14

[56] References Cited
UNITED STATES PATENTS

| | | | |
|---|---|---|---|
| 1,867,484 | 7/1932 | Wolfe et al. | 64/11 R |
| 1,868,818 | 7/1932 | Elsengian | 64/11 R |
| 2,312,470 | 3/1943 | Julien | 64/11 R |
| 2,995,907 | 8/1961 | Orain | 64/11 R |

Primary Examiner—Samuel Scott
Assistant Examiner—Randall Heald
Attorney, Agent, or Firm—Howson and Howson

[57] ABSTRACT

A coupling for transmitting torque between at least a pair of rotatable members, said members having spaced apart, complementary peripheral surface portions of non-circular cross section, coupling means comprised of elastomer and metal layers and consisting of at least two sections in abutting side by side relation, one surface portion of said coupling means abutting the peripheral surface portion of one of said members and another surface portion of said coupling means abutting the peripheral surface portion of said other member whereby rotation of one member effects through said coupling means rotation of said other member.

10 Claims, 6 Drawing Figures

VIBRATION DAMPING COUPLING

The present invention relates to a vibration damping coupling for transmitting a torque between two rotatable elements, one of which being rigidly connected to a coupling element via a preferably central part of the coupling element and the other being rigidly connected to the coupling element via a preferably peripheral part of the coupling element.

Torque-transmitting flexible couplings, i.e., such couplings which permit a certain angular displacement of the connected shafts in their direction of rotation, are used in many applications. By the fact that one shaft is permitted to rotate at a certain angle in comparison to the other shaft, sudden torque peaks can be taken up in the coupling itself, which is favorable for example, in driving devices for the rolls in a rolling mill in which sudden torque peaks occur at the moments when the material to be rolled is introduced between the rolls. Such sudden high torques often cause harmful vibrations and can easily cause a breakdown of, for example, the gear box of the roll drive.

Couplings of the kind referred to in the introduction of the description are previously known for example by the German Offenlegungsschrift No. 1,575.964. This publication shows a coupling device with a member arranged between two shaft ends, the member consisting of a number of layers of alternatingly smooth and corrugated, mainly polygon-shaped rings of a steel band. Such couplings have, however, certain drawbacks. For example, if a good flexibility is to be achieved, the corrugated steel bands must be of a spring-steel material, which makes the device comparatively expensive. Furthermore, great friction forces occur in the different layer surfaces in this construction, which causes wear and may generate disturbing noise if the device is not carefully lubricated. Regular lubrication means increasing maintenance costs.

It is also known to make couplings with an elastic portion consisting of a number of layers of alternatingly metal band and e.g., rubber band. These layers can be either spiral wound or consist of concentric rings. Examples of such couplings are shown in the U.S. Pat. Nos. 2,995,907 and 2,752,766. The elastic portions of these couplings are complicated to produce, because the manufacturing process must be very accurate, if the torque transmitting and the damping properties are to be equal over the whole cross section. If the tension is varying between the differnt winding turns or if the dimensional tolerances of the concentric rings are rough, the properties of the elastic portion will vary uncontrolled. Furthermore, different elasticity properties in different turning directions are obtained in couplings with spirally wound layers.

A coupling according to the present invention, the characterizing features of which will appear in the accompanying claims, has a high elasticity and good vibration damping properties in both directions, but despite this a great torque transmitting ability, and it can be produced in a simple way at low cost. Furthermore, it needs no maintenance.

Figure 2:
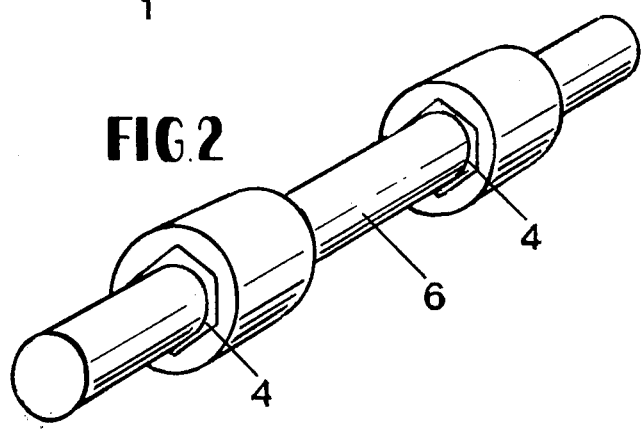
Figure 3:
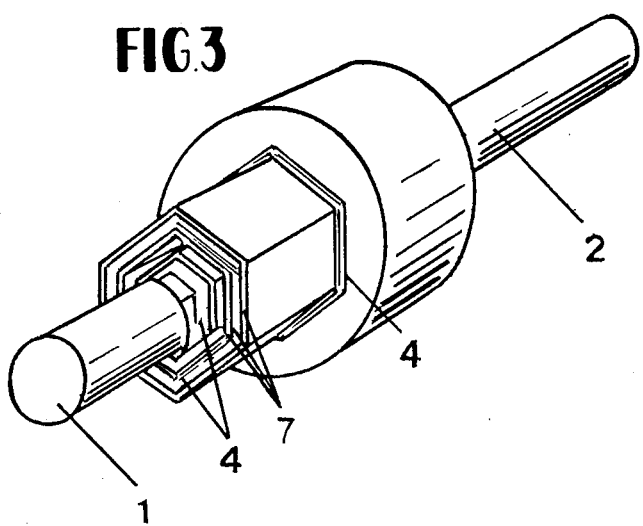

The invention will now be described in detail with reference to the accompanying drawings, in which FIGS. 1, 2 and 3 show perspective views of three different embodiments.

Figure 4:
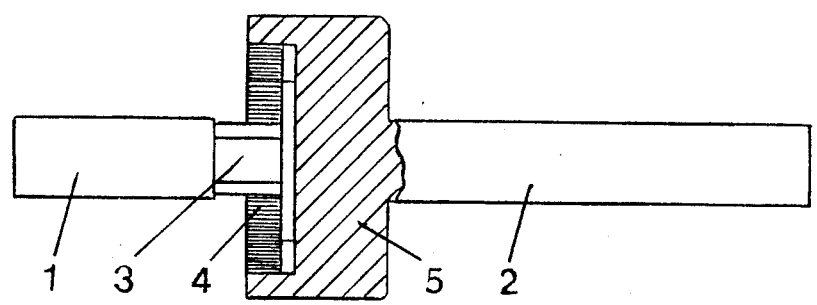
Figure 5:
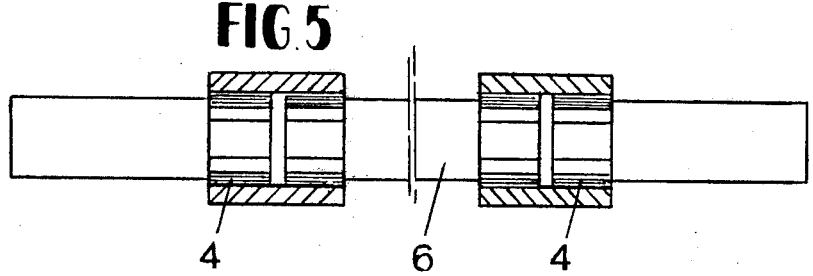
Figure 6:
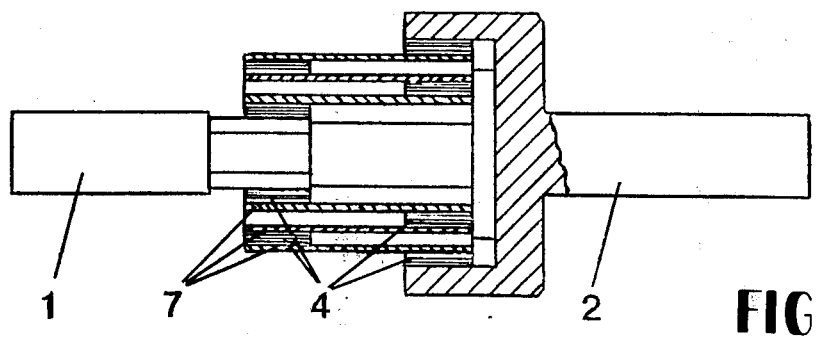
Figure 7:
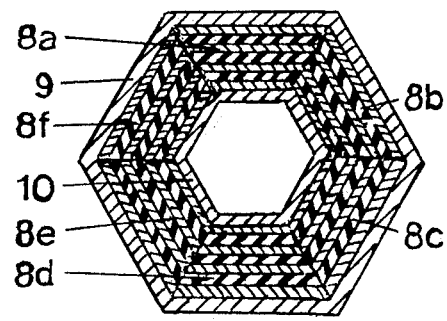

FIGS. 4, 5 and 6 show axial sections of the respective embodiments, and FIG. 7 shows a cross section through the flexible portion of the coupling.

In the device shown in FIGS. 1 and 4, two shafts 1 and 2 are connected by a coupling according to the invention.

One end of the shaft 1 is provided with a portion 3 with a non-circular, in the shown embodiment hexagonal envelope surface, which portion is inserted in a corresponding central bore in a coupling element 4. The coupling element also has a non-circular, in this case hexagonal envelope surface, which is inserted in a corresponding bore in a coupling member 5 provided at one end of the shaft 2. The element 4 is produced in a manner which is described in connection to FIG. 7 further below.

By the non-circular, preferably polygonal form of the coupling element 4 and the corresponding bore in the member 5 and of the end portion 3 of the shaft 1, the shafts 1 and 2 are secured to each other without the coupling element 4 having to be fixed in its position by the special torque-transmitting, fixing means. The damping and flexibility properties of the coupling can be varied within a given dimension of the element 4 by, for example, varying the ratio between the thickness of the metal and the elastomer layers, or giving the metal and the elastomer layers a varying cross section shape.

If an especially high degree of flexibility is desired in the coupling a number of coupling elements 4 can be connected in series, as shown in FIGS. 2 and 5, possibly by using one or more intermediate shafts 6.

In FIGS. 3 and 6 another arrangement is shown, which gives a high degree of flexibility. The shafts 1 and 2 are connected with a coupling means comprising a number of coaxial coupling elements 4, which are mutually connected by a number of coaxial torsion sleeves 7, the innermost element being connected to the shaft 1 and the outermost element with the shaft 2 in a way corresponding to that which has been described in connection to FIGS. 2 and 4. In the device according to the embodiment of FIGS. 3 and 6, the torsional turning in the sleeves 7 is cooperating to give the coupling good flexibility and damping properties. The axial extension of the coupling can be kept small despite the fact that the torsion sleeve 7 has a considerable total length and the number of coupling elements 4 is comparatively great.

In FIG. 7 a cross section through the flexible portion of the coupling according to one embodiment of the invention is shown. The layers of alternatingly metal and elastomer material are created by a number of sections 8a –8f built up by metal and elastomer plates, which plates can be joined by, for example, vulcanization. The sections are together forming a polygon-shaped ring in which the respective section makes up one side. The ring can be kept together by the shape of the shaft ends which are to be connected. These shaft ends are shaped analogous to what is shown in FIGS. 1 and 4, whereby the sections are mounted in the polygonal bore in the coupling member 5, or the sections can be surrounded by and possibly surround a closed ring, 9, 10, with a polygonal bore or a polygonal envelope surface, respectively. These rings are connectable to the respective shaft ends.

When a torque is transmitted over such a coupling, the corners of the polygon shaped inner shaft end or the ring 10 are pressed inwards a certain distance, compressing the resilient elastomer plates in each section 8a –8f, since the sections are not constituting a closed ring, but each section can be displaced in relation to adjacent sections. In this way good elasticity properties are achieved and good torque transmitting properties are retained.

I claim:

1. A coupling for transmitting torque between at least a pair of rotatable members, said members having spaced apart, complementary peripheral surface portions of non-circular cross section, coupling means comprised of elastomer and metal layers and consisting of at least two sections in abutting side by side relation, one surface portion of said coupling means abutting the peripheral surface portion of one of said members and another surface portion of said coupling means abutting the peripheral surface portion of said other member whereby rotation of one member effects through said coupling means rotation of said other member.

2. A coupling as claimed in claim 1 wherein said sections are comprised of layers of alternatingly metal or elastomer material.

3. A coupling as claimed in claim 1 wherein said layers are joined together by vulcanization.

4. A coupling for transmitting torque between at least a pair of rotatable members, one of said members having a polygonal peripheral surface portion, the other of said members having a polygonal peripheral surface portion, a coupling element comprised of a plurality of sections of trapezoidal cross section corresponding in number to the sides of said surface portions disposed in side by side abutting relation, each section having a surface portion confronting and engageable with said peripheral surface portions and each section consisting of metal and elastomer layers.

5. A coupling for transmitting torque between at least a pair of rotatable members, one of said members having an interior polygonal peripheral surface portion, the other of said members having an exterior polygonal peripheral surface portion, a coupling element comprised of a plurality of sections of trapezoidal cross section corresponding in number to the sides of said surface portions disposed in side by side abutting relation, each section having a surface portion confronting and engageable with said interior and exterior peripheral surface portions and each section consisting of metal and elastomer layers.

6. A coupling as claimed in claim 5 wherein said members are shafts, one shaft having an enlarged coupling sleeve at one terminal end thereof, the inner axially extending surface of said sleeve forming said interior polygonal surface portion, the outer terminal end of the other shaft being of polygonal cross section and forming said exterior surface portion, said interior and exterior surface portions being in confronting radially spaced relation, said shafts being coaxial and the sides of the interior and exterior surfaces being in parallel relation.

7. A coupling as claimed in claim 5 wherein said members are shafts, one shaft having an enlarged coupling sleeve at one terminal end thereof, the inner axially extending surface of said sleeve forming said interior polygonal surface portion, the outer terminal end of the other shaft being of polygonal cross section and forming said exterior surface portion, said interior and exterior surface portions being axially spaced apart and said coupling means being axially elongated so that a portion of the outer surface thereof engages said interior surface portion and a portion of the inner surface of the coupling means engages said exterior surface portion.

8. A coupling for transmitting torque between a series of coaxially oriented shaft members, adjacent shaft members in said series each having terminal end portions with an exterior polygonal peripheral surface portion, a sleeve element circumscribing said terminal end portions having an internal polygonal surface portion confronting and radially spaced from said exterior polygonal surface portions of said adjacent shaft members and a coupling element comprised of a plurality of trapezoidally shaped sections corresponding in number to the sides of said surface portions disposed in the space between said sleeve member and terminal end portions of adjacent shafts, said sections disposed in side by side abutting relation and engageable with said interior and exterior peripheral surface portions, each section consisting of metal and elastomer layers.

9. A coupling for transmitting torque comprising inner and outer sleeve members having confronting exterior and interior polygonal peripheral surfaces and a coupling element comprised of a plurality of sections of trapezoidal cross section corresponding in number to the sides of said surface portions disposed in side by side abutting relation, each section having a surface portion confronting and engageable with said interior and exterior peripheral surface portions and each section consisting of metal and elastomer layers.

10. A coupling for transmitting torque between at least a pair of rotatable members, one of said members having a polygonal exterior peripheral surface portion, the other of said members having a polygonal interior peripheral surface portion, a coupling element comprised of a plurality of sections of trapezoidal cross section corresponding in number to the sides of said surface portions disposed in side by side abutting relation, each section having a surface portion confronting and engageable with said peripheral surface portions and each section consisting of metal and elastomer layers, the angularly disposed sides of adjacent sections being in abutting relation and the parallel inner and outer faces of said sections abutting the interior and exterior peripheral surface portions of said members.

* * * * *

UNITED STATES PATENT AND TRADEMARK OFFICE
CERTIFICATE OF CORRECTION

PATENT NO. : 4,012,923
DATED : March 22, 1977
INVENTOR(S) : Bengt Lundgren

It is certified that error appears in the above-identified patent and that said Letters Patent are hereby corrected as shown below:

(30) Foreign Application Priority Data

January 13, 1975 Sweden.........7500297-2.

Signed and Sealed this twelfth Day of July 1977

[SEAL]

Attest:

RUTH C. MASON
*Attesting Officer*

C. MARSHALL DANN
*Commissioner of Patents and Trademarks*